Jan. 20, 1931.  A. S. KNOWLES  1,789,312
METHODS OF AND APPARATUS FOR DEHYDRATING AND DISTILLING
HEAVY HYDROCARBON OILS TO RECOVER CONSTITUENTS
THEREOF IN LIQUID FORM
Filed Dec. 13, 1926  3 Sheets-Sheet 3

Witness
Milton Lenoir

Inventor
Alexander Stephen Knowles,
By John L. Jackson.
Attorney.

Patented Jan. 20, 1931

1,789,312

UNITED STATES PATENT OFFICE

ALEXANDER STEPHEN KNOWLES, OF CHICAGO, ILLINOIS, ASSIGNOR TO TAR AND PETROLEUM PROCESS COMPANY, OF CHICAGO, ILLINOIS, A CORPORATION OF ILLINOIS

METHODS OF AND APPARATUS FOR DEHYDRATING AND DISTILLING HEAVY HYDROCARBON OILS TO RECOVER CONSTITUENTS THEREOF IN LIQUID FORM

Application filed December 13, 1926. Serial No. 154,347.

My invention has to do with the distillation, dehydration and cracking of tar and other heavy hydro-carbon oils for the purpose of liberating light, middle and heavy oils, and recovering certain of the constituents of the material treated without carbonization and in liquid form. My present process therefore contemplates the treatment of the hydro-carbon oils at temperatures below those required for carbonization.

The objects of my invention are to provide a process that may be used for the continuous production of pitch or other liquid derivatives of the destructive distillation of hydro-carbon oils carried on for the purpose of dehydrating them and cracking them to liberate lighter oils, such for example as those used for fuel for internal combustion engines; and to provide improved apparatus for practicing such process economically and efficiently. I accomplish these objects as illustrated in the drawings and hereinafter described. What I regard as new is set forth in the claims.

In the accompanying drawings, which illustrate a desirable form of apparatus for use in practicing my improved process, Fig. 1 is a longitudinal vertical section;

Figure 1:
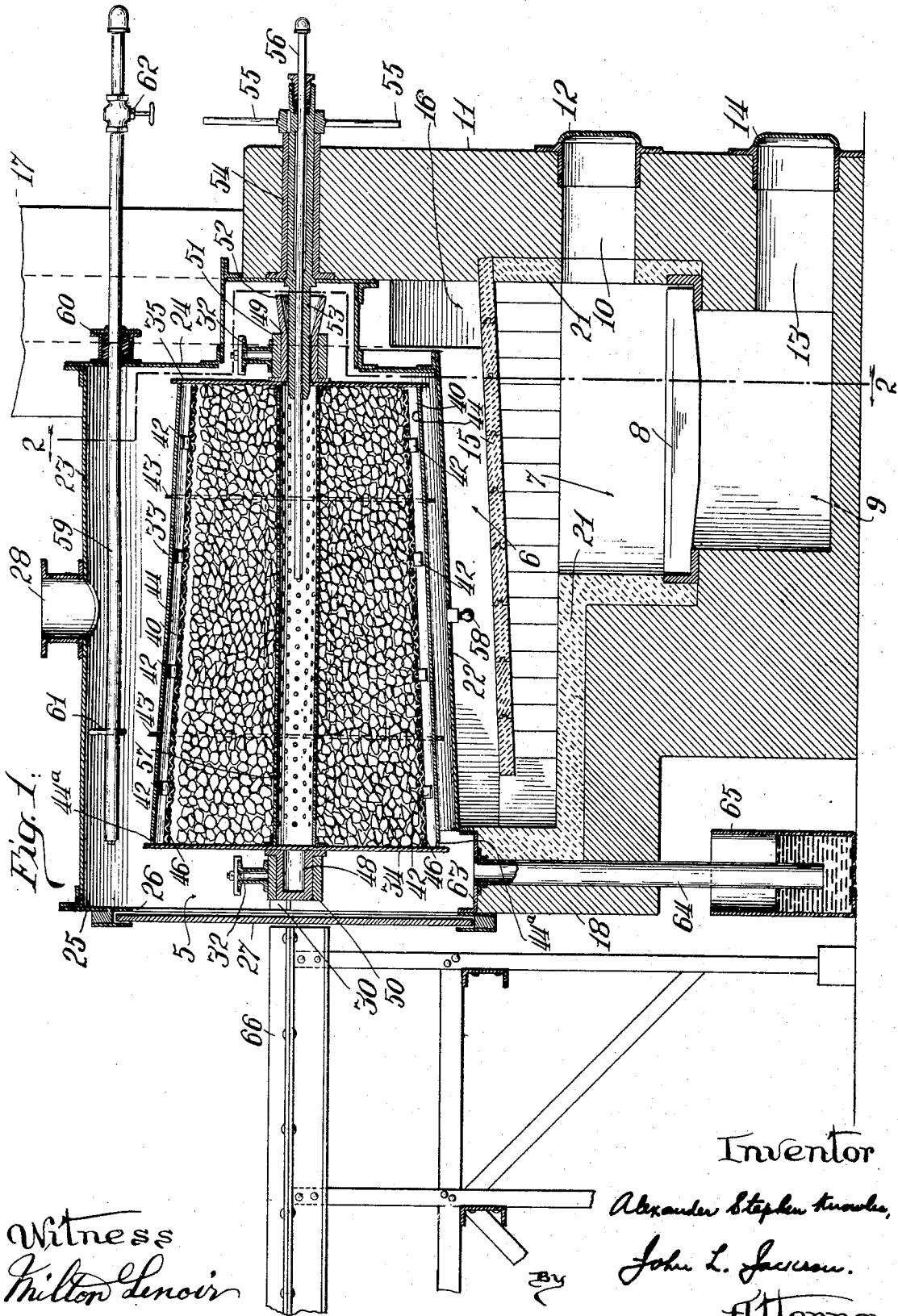

As my improved process may best be explained in connection with the apparatus used in practicing it, the latter will be described first.

The present apparatus in the form illustrated in the drawings is in some respects similar to that shown and described in my pending application, Serial No. 153,780, filed December 10, 1926, since its comprises a suitable oven or furnace of such form as to provide a horizontally elongated heating chamber adapted to receive an elongated basket or holder, preferably cylindrical in form, and adapted to contain a loose porous bed composed of pieces of carbonaceous or other material used in practicing the process. The basket is adapted to rotate and the bed of material therein does not completely fill it, so that by rotating the basket the pieces composing the bed may be agitated to preserve its porosity, as will be explained more in detail later on. The basket is movable into or out of the heating chamber, which is heated by heat generated in a combustion chamber located below the heating chamber, and provision is made for supplying the materials to be treated to the basket from above. Also devices are provided for introducing pre-heated gas or steam, superheated if desired, under pressure to the body of the bed, so that it may pass out through the interstices in the bed for a purpose that will be hereinafter explained. The lighter oils that are distilled off pass out of the basket through openings in its periphery, and are discharged from the heating chamber through a suitable duct. The apparatus of my said pending application is, however, designed for use in the recovery of solid matter in the form of substantially pure carbon, without the production of pitch or other liquid residue, and in various other respects also it differs from my present apparatus, which, as has been stated, is intended for use in the continuous production of pitch or other liquid derivatives of the materials treated.

Referring now to the drawings I shall describe in detail the apparatus illustrated therein.

As best shown in Fig. 1, my improved apparatus comprises a heating chamber 5 arranged over a combustion chamber 6 in which heat is generated by the combustion of coal or other suitable fuel. In the illustrated construction provision is made for burning coal, there being a fire-box 7 having grate bars 8 for supporting the fuel, and an ash pit 9 below the grate bars. Coal is introduced through a passage 10 in the front wall 11 of an oven-like structure in which the heating and combustion chambers are enclosed, said opening being provided with a door 12. A passageway 13 leads to the ash pit and is provided with a door 14. Preferably an approximately horizontal bridge wall 15, of fire-brick or other suitable refractory material, is provided in the combustion chamber so that the burning gases and products of combustion follow a circuitous path leading to a passage 16 through which they pass to a stack 17.

The oven comprises a rear wall 18 and side walls 19, 20, all of which may be of brick, and they are preferably lined with fire-brick, or other suitable refractory material, as shown at 21.

Figure 2:
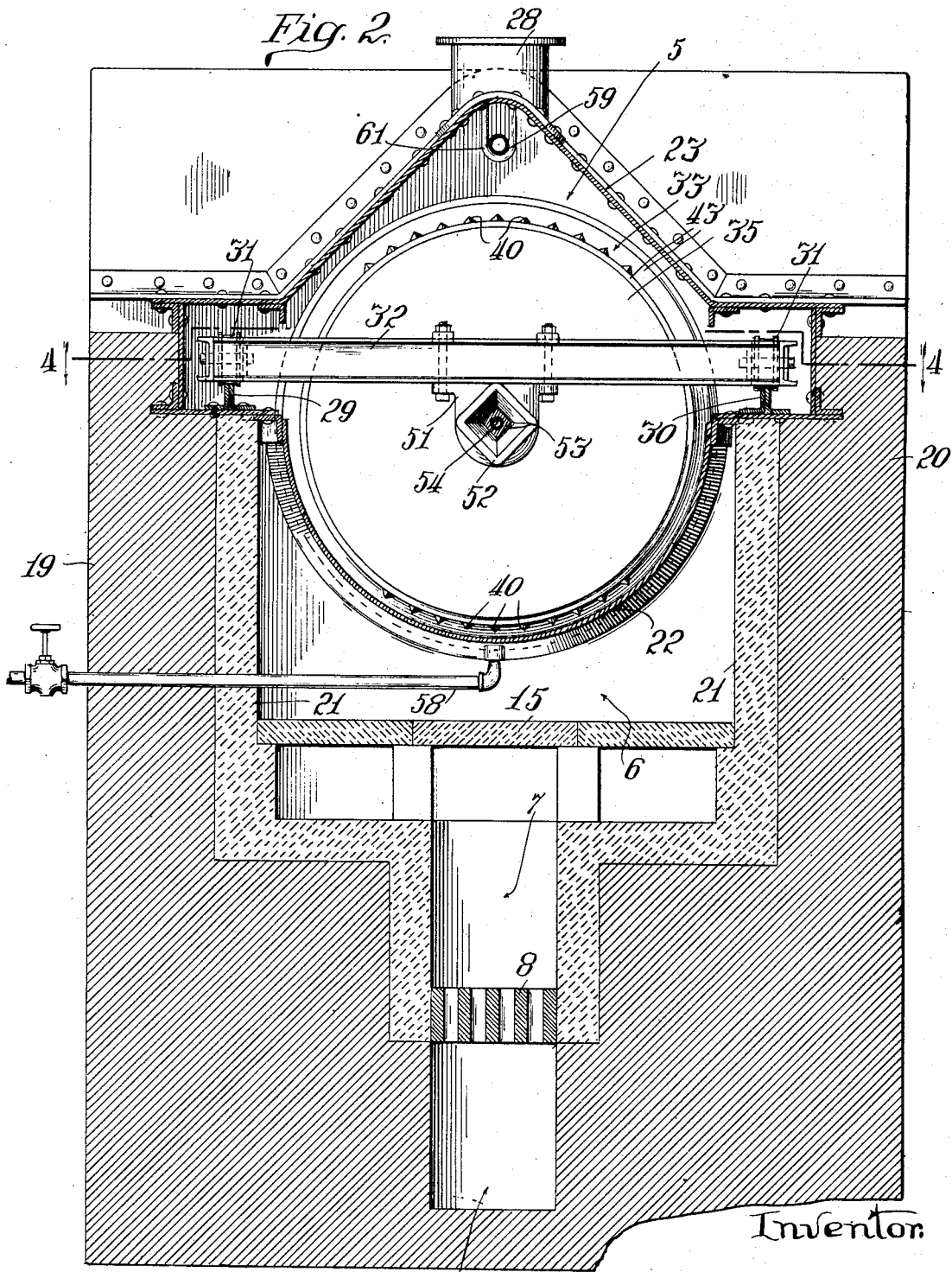
Fig. 2 is a vertical cross-section on line 2—2 of Fig. 1.

The heating chamber 5 has no communication with the combustion chamber, and it is in the form of an elongated approximately circular chamber, the lower wall of which consists of a semi-circular metal plate 22 suitably supported by the side walls of the oven, as best shown in Fig. 2. The upper portion of the heating chamber is composed of an inverted V-shaped plate 23 which is also supported by the side walls of the oven, and it is closed at its ends by end plates 24, 25 that are connected with the end walls of the oven, as best shown in Fig. 1. The rear end wall 25 is provided with an opening 26 large enough to permit of the passage of the basket hereinafter referred to, which opening is adapted to be closed by a sliding door or doors 27 so as to prevent the admission of air to the heating chamber. A duct 28 for the discharge of the distillate connects with the apex of the upper wall 26 of the heating chamber, preferably midway of the length thereof, as shown in Figs. 1 and 2. By this arrangement a dome is provided at the upper part of the heating chamber by which the distillate is directed to the outlet duct 28.

As best shown in Fig. 2, tracks 29, 30 are provided at opposite sides of the heating chamber and extend longitudinally thereof, on which tracks ride rollers 31 carried by a frame 32 that revolubly supports a basket 33. This basket is designed to contain a loose porous mass composed of pieces of carbonaceous or other material the size of which depends upon the material treated and the products that it is desired to obtain. Such pieces may be either coke, anthracite coal, or other suitable carbonaceous material, or they may be non-carbonaceous, such as steel filings, copper or steel wire, or balls, or non-metallic matter such as sandstone or igneous rock. The basket is not entirely filled with such material, sufficient space being left so that when the basket is rotated to a greater or less extent the porous bed will be agitated by the rolling of the pieces at the top down in the direction of rotation, thereby re-arranging the pieces, and breaking up any channels that may have been formed or any masses caused by agglomeration, so that the porosity of the bed is maintained.

Figure 3:
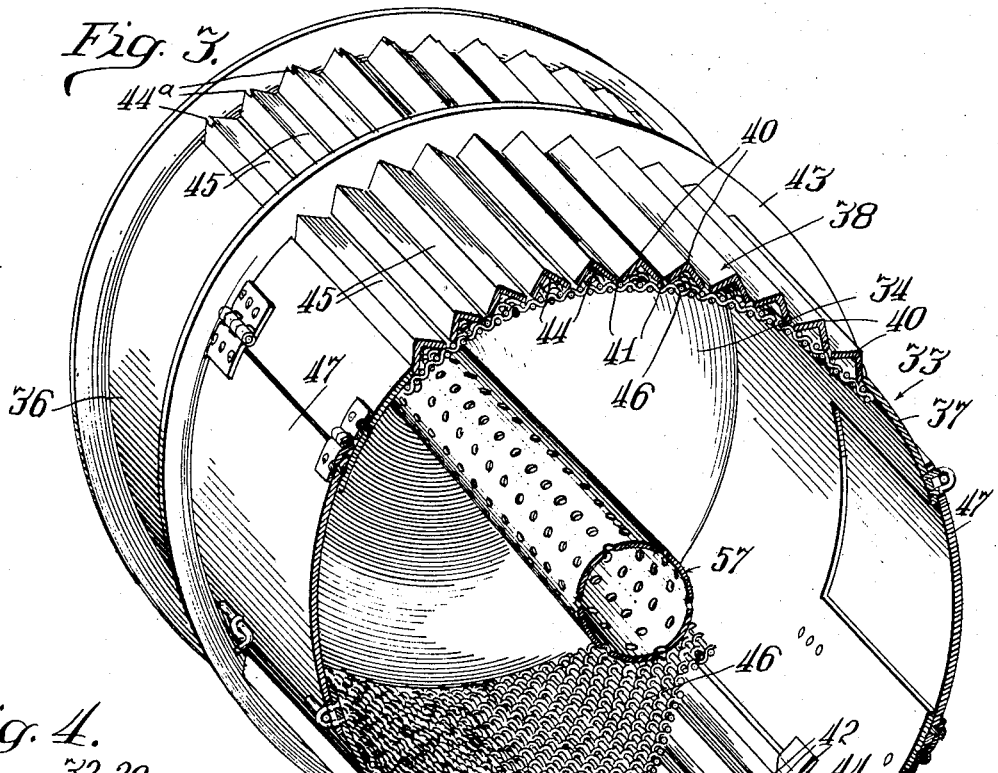
Fig. 3 is a fragmentary perspective view of the rotary cylindrical basket that contains the material while it is being treated.
Figure 4:
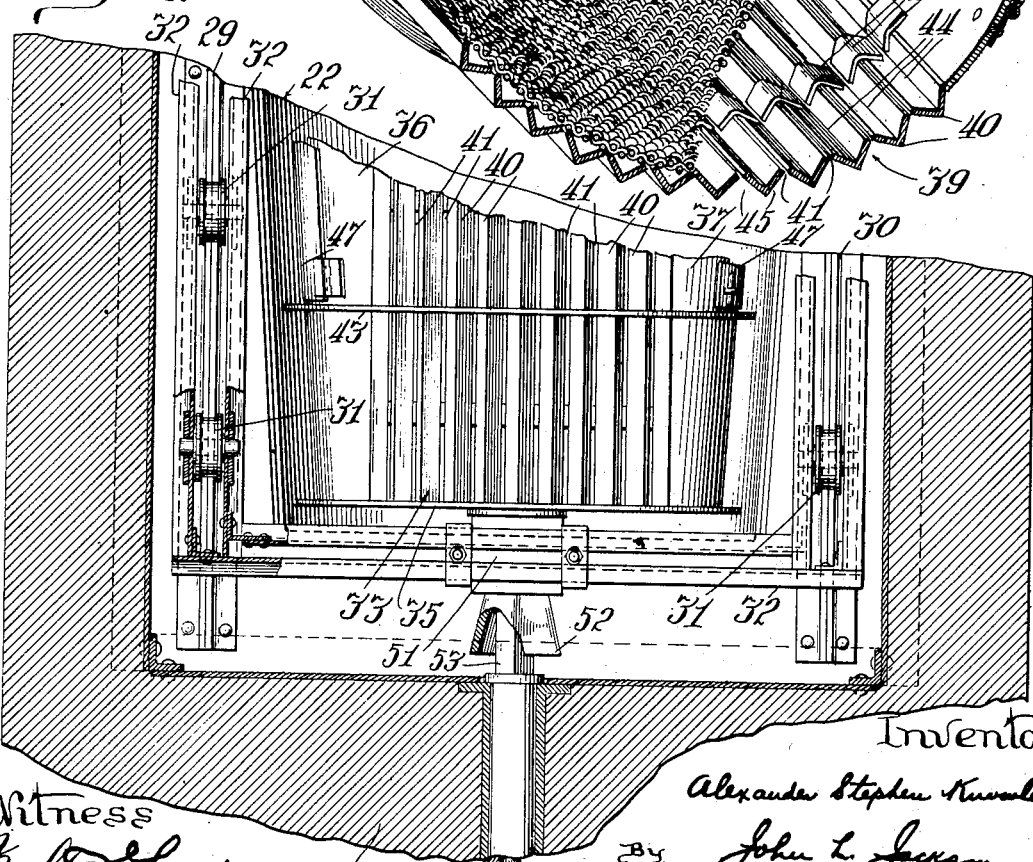
Fig. 4 is a partial horizontal section on line 4—4 of Fig. 2.

The construction of the basket 33 is best shown in Figs. 1 and 3, from which it will be seen that it comprises end plates 34, 35, the end plate 35 being preferably of somewhat smaller diameter than the end plate 34. The intermediate portion of the basket, that is to say, the part between the end plates, comprises two oppositely disposed curved sections 36, 37, composed of unperforated plates, and two oppositely disposed perforated sections, indicated generally by the reference numerals 38, 39, these four sections together forming a cylindrical container, which, as best shown in Fig. 1, is frusto-conical in form. Each of the sections 38, 39 is made up of a series of angle irons 40 arranged with their ridges directed outwardly, and having their side margins juxtaposed but separated by narrow spaces 41 forming longitudinal slots or perforations. The several angle irons of each section are firmly secured together on the inside by a series of plates or clips 42 welded or otherwise firmly secured in place. The end clips of the series serve to secure the corresponding angle irons to the plates 36 or 37 as the case may be. On the outside the several sections of the basket are secured together by hoops or bands 43 placed at suitable intervals and welded or otherwise held in place. The angle irons 40 arranged as described provide inclined gutters 44 on the inside of the basket that extend longitudinally thereof, and when a given perforated section is brought to its lowermost position so that it forms the bottom of the basket such gutters are inclined downward toward the larger end of the basket, which, in the illustrated construction, is what will be termed its rear end. The opposite perforated section will in such case be at the top of the basket, and will provide longitudinally extending funnels 45, with the slots 41 at the bottom thereof, for directing the material to be treated into the basket and distributing it upon the porous bed therein. Obviously by giving the basket half a turn, or inverting it from the position described, the perforated sections will be reversed. The liquid flowing along the gutters 44 cannot escape through the slots 41 since such slots are then turned upward, as clearly shown in Fig. 3. The basket is provided with an inner shell or lining in the form of a reticulated cylinder 46 suitably secured in place to keep the pieces of material composing the bed out of the gutters 44, so that the flow of liquid along such gutters will not be obstructed. The imperforate sections 36, 37 are provided with doors 47, through which access may be had to the interior of the basket to remove or replace the bed of material therein, as best shown in Fig. 3.

The end plates 34, 35 of the basket support axially disposed trunnions 48, 49 which are journaled in hangers 50, 51, secured to the end portions of the frame 32 so that the basket is free to rotate about its longitudinal axis. The trunnion 49 is hollow and is flared at its outer end, as shown at 52 in Fig. 1, for the convenient entrance thereinto of a tubular shaft 53 rotatably mounted in a suitable bearing 54 provided in the front end wall 11. The inner end portion of the shaft 53 is square or otherwise non-circular in cross-section, and the passage in the trunnion 49 is correspondingly shaped, so that by rotating said shaft the basket may be rotated from outside of the oven. When the basket is withdrawn from the heating chamber, as will be hereinafter described, the trunnion 49 simply slides off the inner end of the shaft 53 without disturbing said shaft, and similarly, when the basket is moved into the heating chamber said trunnion again operatively engages the shaft 53. Any suitable means may be provided for rotating the shaft 53, such as a series of arms 55 secured on the outer end portion thereof, or provision may be made for rotating it by power if desired.

The shaft 53 is made hollow, as best shown in Fig. 1, and through it extends a pipe 56 connected with a suitable source of supply of gas or steam under pressure. This pipe is arranged to discharge axially into the body of the bed through a perforated pipe 57 of considerably greater diameter that extends axially of the basket from end to end thereof, being supported by the end plates 34, 35. By this arrangement the gas, which is preferably pre-heated, or the steam, which may be superheated, is introduced into the central portion of the bed so that it may pass out through the interstices thereof to promote the discharge of the distillate therefrom and also cleanse the bed, and in that way maintain its efficiency.

In addition to the pipe 56 which discharges gas or steam to the interior of the bed, I provide also a pipe 58 arranged to discharge into the space between the bottom 22 of the heating chamber and the lower portion of the basket, to protect the contents of the basket against damage from the intense heat generated in the combustion chamber, and to aid in obtaining a more uniform heating of the lower portion of the bed.

The material to be treated is supplied to the upper portion of the bed of material in the basket through a spray pipe 59 which passes through a stuffing box 60 in the front wall 24 of the heating chamber and extends longitudinally over the basket, said pipe being located about centrally of the dome, as best shown in Fig. 2. Its inner end is supported in any suitable way, as by a hanger 61, shown in Figs. 1 and 2. Said pipe is perforated at its under side and is so mounted that it may be rocked about its longitudinal axis to facilitate distribution of the material to be treated upon the upper portion of the basket. The tar or other hyro-carbon to be treated may be supplied from any suitable source, and its admission is controlled by a valve 62 shown in Fig. 1.

At the rear end of the heating chamber a transverse trough 63 is provided, so placed as to receive the discharge from the several gutters 44 at the under side of the basket. As clearly shown in Fig. 1, the lower ends of said gutters overlie the trough 63; consequently the liquid matter running down the gutters 44 is discharged into the trough 63, from which it drains through a pipe 64 into a receptacle 65, as shown in Fig. 1. Openings 44ª are provided at the discharge ends of the gutters for the escape of the liquid.

Leading up to the rear end of the heating chamber are tracks 66 alined with the tracks 29, 30 within said chamber, the arrangement being such that when the doors 27 are opened the basket may be run out of the heating chamber upon the tracks 66. The outer tracks are disconnected from the inner ones to permit the doors 27 to be closed tightly.

The operation is as follows: The basket properly charged with loose pieces of carbonaceous or other suitable material is run into the heating chamber and the doors 27 are tightly closed. This movement of the basket into the heating chamber effects the engagement of the shaft 53 with the trunnion 49 so that by rotating said shaft the basket may be rotated. By the combustion of fuel in the combustion chamber the heating chamber is heated to a temperature suitable for the recovery by distillation of the products desired, the lower portion of the bed being, of course, heated to a higher temperature than the upper portion thereof. The basket is turned so that one of the perforated sections 38 or 39 is at the top and the other is at the bottom, and tar or other hyro-carbon oil to be treated is introduced through the pipe 59, which deposits it in the funnel-like portions 45 at the outer surface of the uppermost section of the basket. The oil is distributed by these funnels upon the upper portion of the bed, entering through the slots 41, and flows over the pieces composing the bed and down thereinto. This effects volatilization of the lighter hydro-carbons which rise through the interstices of the bed and pass out through the duct 28. The less volatile matter passes on down into the bed and is subjected to higher temperatures, with consequent further volatilization, and finally the residuary liquid is deposited in the gutters 44 at the bottom of the bed by which it is conducted to the transverse trough 63 and discharged into the receptacle 65. During this operation preheated gas under pressure, or steam, superheated if desired, is admitted to the interior of the bed through the central pipe 57, and rises through the bed, thereby aiding in the escape of volatilized matter therefrom, and also washing or cleansing the pieces composing the bed from residual matter that may have been deposited thereon, the accumulation of which would tend to close its interstices and clog it. The gas or steam also aids in heating the bed, and thereby promotes volatilization.

At suitable intervals, depending on circumstances, the basket is inverted, or given a half turn, which agitates the bed and effects a re-adjustment of the pieces composing it, thereby destroying any channels that may have been formed in the bed and loosening up any masses that may have been formed by agglomeration of residues resulting from the distilling operation. The porosity of the bed is therefore preserved so that its temperature may be more accurately regulated and the product produced be controlled with greater accuracy. During the operation there is a constant drainage from the bed of the residuary liquid, which is at once removed from the heating chamber so that after its separation it will not be subjected further to heat.

The operation is conducted at temperatures below that required for carbonization, so that there is no deposition of solid matter in the bed. The temperature used depends upon the product that it is desired to produce and is controlled by various factors that are well understood by those familiar with the art. For example, if it be desired to treat lighter hydro-carbon liquids to dehydrate them and recover the lighter oils, temperatures in the heating chamber of from 100° C. to 170° C. would be used, in which case the liquid recovered by drainage would be of lighter specific gravity than substances such as pitch. By conducting the operation at temperatures of from 170° C. to 350° C. pitch of greater or less consistence can be recovered by drainage. Furthermore, the size of the pieces composing the bed also is a factor that affects the operation, since the finer such pieces are the greater the cracking that is effected.

It will be understood, of course, that when the basket is being rotated the introduction of raw material is stopped, and before rotating the bed it is desirable to wait long enough after the shutting off of the supply to permit the treated product to drain from the bed, and to reach the temperature which will produce the quality of liquid desired.

From the foregoing description it will be seen that the apparatus described is well adapted for the continuous distillation of tars and other hydro-carbon oils to recover therefrom any residuary liquids up to pitch of any degree of hardness, by providing for distributing the materials to be treated upon the upper portion of a loose porous bed of suitable material, heated by extraneous heat applied from below, and continuously removing the residuary liquid by drainage from the bed; also that it provides, as a further step in the process, for maintaining the porosity of the bed by agitating the same, and by subjecting it to the washing and purging action of hot gas or steam introduced into the body of the bed.

The distillate that passes out of the heating chamber through the duct 28 may, of course, be subjected to any desired further treatment according to processes well understood in the art, or if desired, the distillate, or certain constituents thereof, may be further treated in the manner above described to accomplish a further cracking.

While I prefer to construct the basket in the manner described, my invention includes making the gutters and slots or perforations in other ways, as for example by using corrugated sections suitably perforated to provide apertures that correspond in location and function with the slots between the angle irons. Also if desired the entire periphery of the basket may be corrugated or otherwise provided with gutters of the character described.

What I claim as my invention and desire to secure by Letters Patent, is—

1. The method of treating hydro-carbon matter in liquid form for the purpose described, which consists in depositing the material to be treated upon the upper portion of a loose porous bed of suitable material exposed to extraneous heat from below, rotating the bed from time to time, and continuously withdrawing the residuary liquid by drainage from the bed.

2. The method of treating hydro-carbon matter in liquid form for the purpose described, which consists in depositing the material to be treated upon the upper portion of a loose porous bed of suitable material exposed to extraneous heat from below, introducing a heated fluid under pressure to the interior of the bed, rotating the bed from time to time, and continuously withdrawing the residuary liquid by drainage from the bed.

3. An apparatus for use in the treatment of hydro-carbon matter in liquid form comprising a heating chamber, a basket rotatable in said chamber adapted to contain a loose porous bed of suitable material, means for applying heat externally of the heating chamber, means for depositing the material to be treated upon the bed, and means for removing the residuary liquid by drainage from the bed.

4. An apparatus for use in the treatment of hydro-carbon matter in liquid form comprising a closed heating chamber, a basket rotatable in said chamber adapted to contain a loose porous bed of suitable material, means for agitating the bed, means for applying heat externally of the lower portion of the heating chamber, means for depositing the material to be treated upon the upper portion of the bed, and means for removing the residuary liquid by drainage from the bed.

5. An apparatus for use in the treatment of hydro-carbon matter in liquid form comprising a heating chamber, a rotatable basket in said chamber adapted to contain a loose porous bed of suitable material, means for depositing the material to be treated upon the upper portion of the bed substantially parallel to the axis of rotation of the basket, means for introducing a heated fluid into the interior of the bed, and means for removing the residuary liquid by drainage from the bed.

6. An apparatus for use in the treatment of hydro-carbon matter in liquid form comprising a heating chamber, a basket rotatable in said chamber adapted to contain a loose porous bed of suitable material, means for applying heat extraneously to the lower portion of the bed, means for depositing the material to be treated upon the upper portion of the bed, means for introducing a suitable gas into the interior of the bed, and means for removing the residuary liquid by drainage from the bed.

7. An apparatus for use in the treatment of hydro-carbon matter in liquid form comprising a heating chamber having an opening at one end, means for closing said opening, a rotatable basket movable endwise into or out of said chamber through said opening, a wheeled frame rotatably supporting said basket, means for rotating the basket mounted at one end of the heating chamber coaxially with the basket and adapted to operatively engage an end portion thereof when the basket is moved into the heating chamber, and means for applying heat externally of the heating chamber.

8. An apparatus for use in the treatment of hydro-carbon matter in liquid form comprising a heating chamber having an opening at one end, means for closing said opening, a rotatable basket movable endwise into or out of said chamber through said opening, a wheeled frame rotatably supporting said basket, means for rotating the basket mounted at one end of the heating chamber coaxially with the basket and adapted to operatively engage an end portion thereof when the basket is moved into the heating chamber, a perforated pipe arranged in the basket co-axially therewith, a stationary pipe disposed co-axially with the basket and extending through said rotating means into said perforated pipe for introducing gas or steam thereinto, and means for applying heat extraneously to the bed.

9. An apparatus for use in the treatment of hydro-carbon matter in liquid form comprising a heating chamber, a basket adapted to contain a loose porous bed of suitable material, said basket being frusto-conical in form and having opposite sections provided with longitudinally extending gutters and slots arranged alternately, and a recticulated inner shell, means for applying heat extraneously to the lower portion of the bed, and means for supplying the material to be treated to the upper portion of the basket.

10. An apparatus for use in the treatment of hydro-carbon matter in liquid form comprising a heating chamber, a basket adapted to contain a loose porous bed of suitable material, said basket being frusto-conical in form and having opposite sections composed of angle irons extending longitudinally of the basket and spaced a short distance apart with their angles outermost, and a recticulated inner shell, means for applying heat extraneously to the lower portion of the bed, and means for supplying the material to be treated to the upper portion of the basket.

11. An apparatus for use in the treatment of hydro-carbon matter in liquid form comprising a heating chamber, a basket adapted to contain a loose porous bed of suitable material, said basket being frusto-conical in form and having opposite sections provided with longitudinally extending gutters and slots arranged alternately, and a reticulated inner shell, means for applying heat extraneously to the lower portion of the bed, means for supplying the material to be treated to the upper portion of the basket, and means for rotating the basket.

12. An apparatus for use in the treatment of hydro-carbon matter in liquid form comprising a heating chamber, a basket adapted to contain a loose porous bed of suitable material, said basket being frusto-conical in form and having opposite sections provided with longitudinally extending gutters and slots arranged alternately, and a reticulated inner shell, means for applying heat extraneously to the lower portion of the bed, means for supplying the material to be treated to the upper portion of the basket, and a stationary trough adapted to receive the drainage from the basket.

ALEXANDER STEPHEN KNOWLES.